United States Patent Office 3,319,868
Patented May 16, 1967

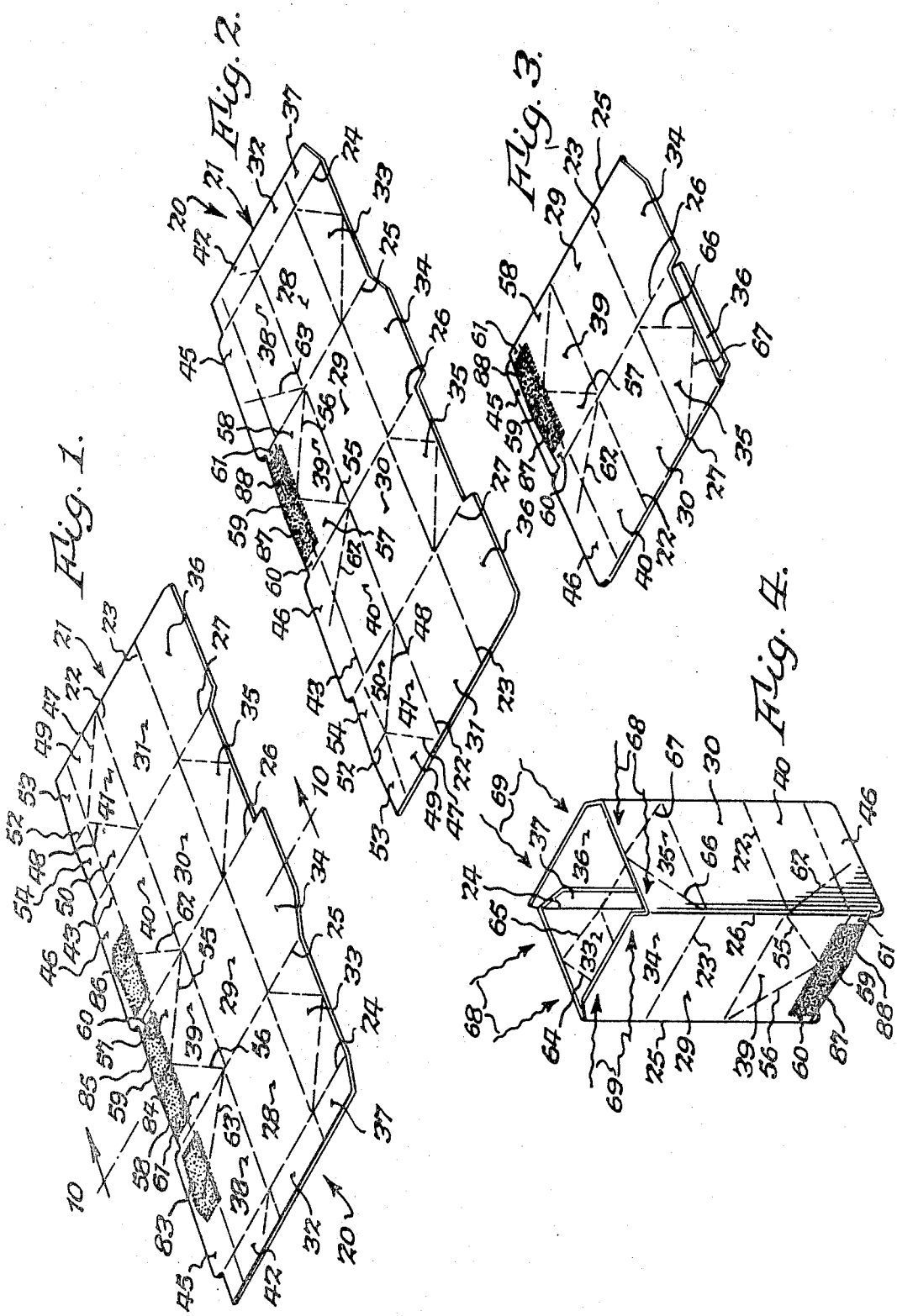

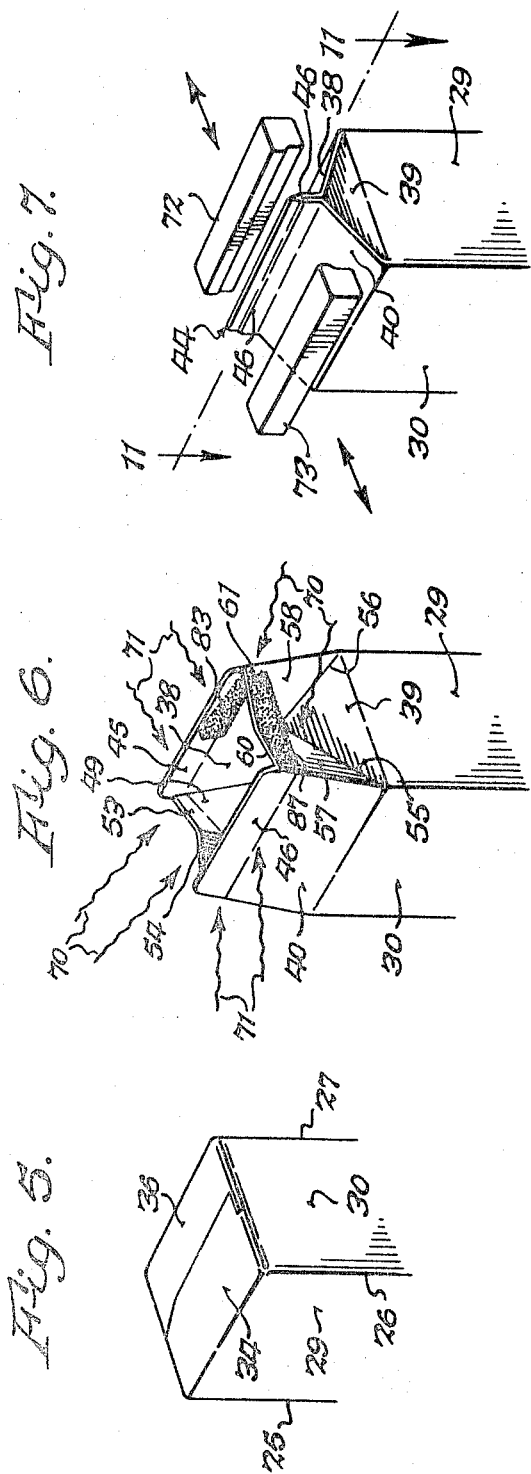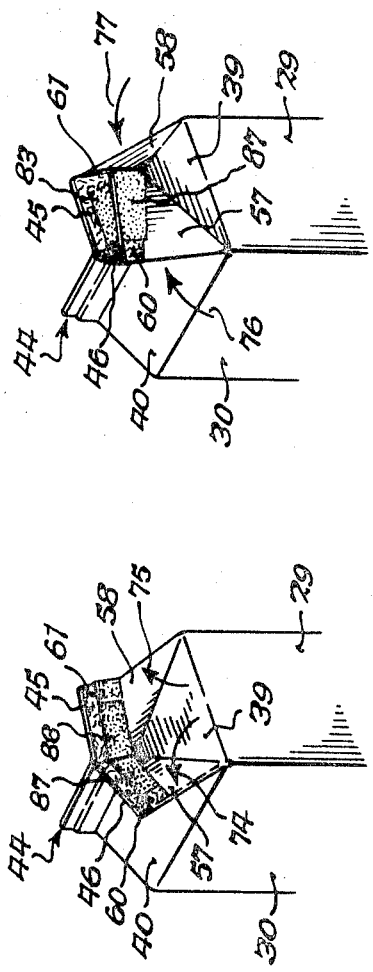

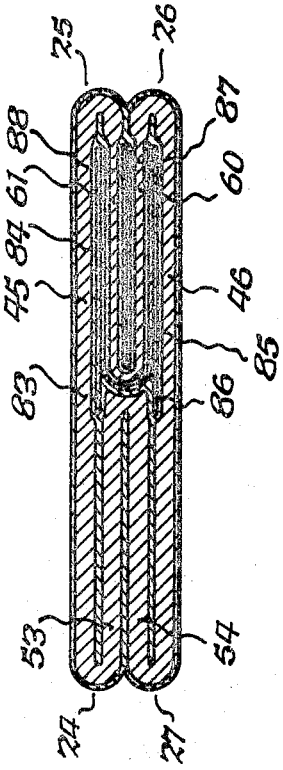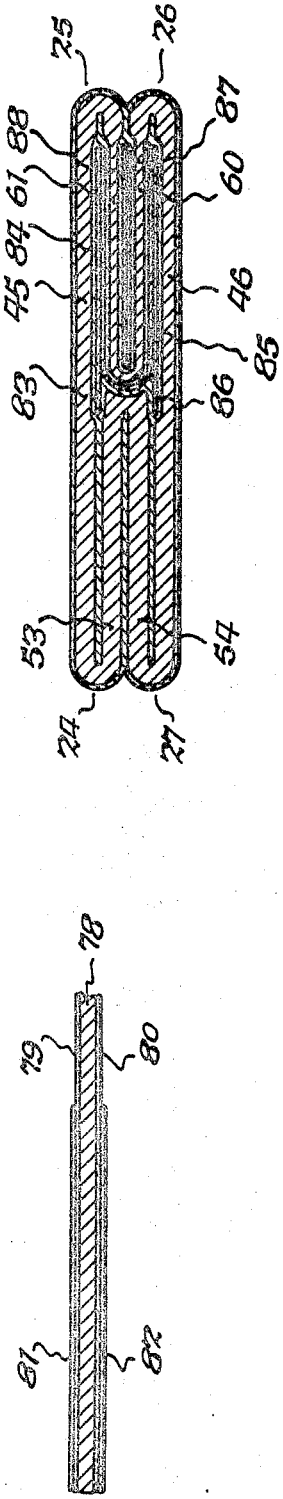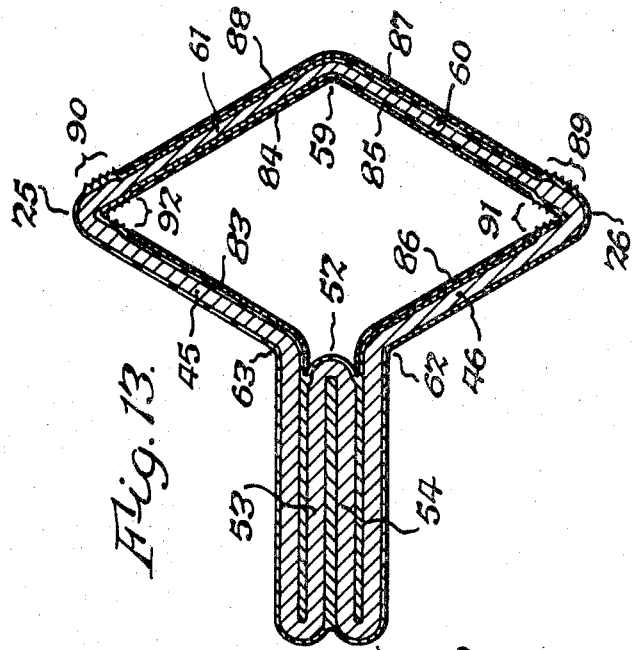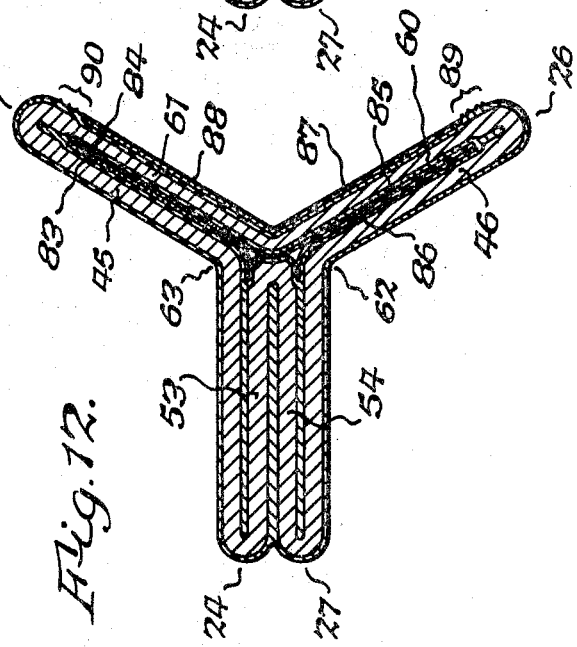

3,319,868
COMPOSITION FOR SEALING PLASTIC
COATED CONTAINERS
Denis K. Huang, Philadelphia, and Harold B. Moors,
Richboro, Pa., assignors to International Paper Company, New York, N.Y., a corporation of New York
Division of application Ser. No. 107,348, May 3, 1961,
now Patent No. 3,292,842, dated Dec. 20, 1966. Continuation of application Ser. No. 343,434, Jan. 16, 1964.
This application May 13, 1966, Ser. No. 551,840
5 Claims. (Cl. 229—17)

This is a division of copending application Ser. No. 107,348, filed May 3, 1961, and a continuation of application Ser. No. 343,434, filed Jan. 16, 1964, now abandoned.

The present invention relates to thermoplastic coated containers and more particularly to compositions for sealing the same.

In the packaging industry, thermoplastic coated paper containers have been widely used as containers for liquids, and, notably, polyethylene coated paper containers have been widely used for merchandising dairy products, fruit juices and like beverages intended for human consumption. A major advantage achieved by using polyethylene coated paper containers is that such containers may readily be sealed against leakage by application of heat to polyethylene surfaces that are to be joined together, the heat acting to soften the polyethylene whereby when two strips of softened polyethylene are pressed together a liquid-tight seal is formed. Gable-topped containers, e.g., containers of the type shown in United States Patent No. 2,750,095 to Alden, issued June 12, 1956, are examples of a form of container particularly well suited to manufacture from polyethylene coated paper stock.

One major difficulty which has been encountered in using polyethylene coated containers, especially when used for beverages, is that the bond between heat-sealed surfaces is so strong that, when an effort is made to open the container by pulling apart two or more such surfaces, the polyethylene will be pulled away from the paper backing on one or the other of the surfaces, exposing a roughened paper surface to the action of liquid as the container is used. Action of liquid on the paper soon produces an unsightly and unsanitary condition which is particularly undesirable where a container is to be opened and tilted repeatedly in dispensing the contents, as in the case of milk containers.

In making polyethylene coated paper milk cartons, heat-sealing is usually effected over limited areas in a definite complicated pattern to yield an operable pouring spout. However, practical production problems prevent limitation of the heat-sealing to only those areas which must be sealed for a liquid-tight container, and it is the additional areas which are undesirably heat-sealed which cause the greatest problem when the spout is opened for dispensing liquid from the container. This problem has been attacked by inserting a strip of metal foil or cellophane tape in the package unit to cover those areas for which heat-sealing is not desired. In this case, the metal foil or cellophane tape prevents bonding between adjacent polyethylene areas. However, use of metal foil or cellophane tape inserts involves substantial added labor and material costs, and, of greater significance, presents a serious obstacle to high speed carton blank manufacture.

The principal object of the present invention has been the provision of a novel and improved coating composition for use in the method described herein.

Other and further objects, features and advantages of the invention will appear more fully from the following description of the invention.

In accordance with the invention, any desired sealing-nonsealing pattern of thermoplastic material may be achieved by coating the area or areas not to be sealed with an abhesive composition which permits the use of usual heat-sealing techniques and apparatus without sealing of the abhesive coated areas. The abhesive coating may be applied by printing, brushing or other suitable techniques, although printing will generally be more desirable for accurate location of the coated areas in a high speed production operation. The abhesive coating should be such that it will readily release the contacting abhesive coated surfaces to provide a clean break of these surfaces. The abhesive coating should also exhibit a high heat resistance to protect the abhesive coating during the heat-sealing operation. And the abhesive coating should present a strong film surface to prevent the melted polyethylene materials from contacting each other during the heat-sealing operation.

So far as is presently known, the greatest utility of the invention is in connection with polyethylene coated paper cartons for merchandising milk and other beverages. However, the utility of the invention is not limited to polyethylene, since the principles of the invention are also usable with other thermoplastic coatings which have similar heat-sealing characteristics. The principles of the invention are also applicable to other containers. However, for convenience, the invention will be described largely in connection with polyethylene coated paper milk containers.

The invention will now be described in greater detail with reference to the appended drawings, in which:

FIG. 1 is a perspective view illustrating one side of a container blank showing the scoring lines and the inhibited or abhesive coated areas;

FIG. 2 is a perspective view of the opposite side of the blank of FIG. 1;

FIG. 3 is a perspective view showing the blank of FIGS. 1 and 2 formed into a flattened tube with the longitudinal edges heat-sealed;

FIG. 4 is a perspective view showing the flattened tube of FIG. 3 in opened condition just prior to the bottom-forming and sealing operation;

FIG. 5 is a perspective view showing the tube of FIG. 4 with the bottom closed and sealed;

FIG. 6 is a perspective view showing the tube of FIG. 4 after having been filled and with the top partially closed;

FIG. 7 is a perspective view showing the tube of FIG. 6 with the top completely formed and sealed and with the presser jaws retreating from the sealing position thereof;

FIG. 8 is a perspective view illustrating the sealed milk carton partially opened;

FIG. 9 is a perspective view illustrating the carton of FIG. 9 in fully opened condition ready for discharge of the contents;

FIG. 10 is an enlarged partial vertical cross-sectional view taken along the line 10—10 of FIG. 1;

FIG. 11 is a sectional view taken along the line 11—11 of FIG. 7;

FIG. 12 is a view similar to FIG. 11 with the carton partially opened; and

FIG. 13 is a view similar to FIGS. 11 and 12 but with the carton fully opened.

Referring now to the drawings, and more particularly to FIGS. 1 and 2, the carton is formed from a blank 20, which is a single integral sheet of paperboard coated on both sides with polyethylene. The coated board is cut and scored so that when the carton is formed it assumes the shape of a rectangular container with a flat bottom and a gable top.

FIG. 1 represents that surface of the blank which will become the inside of the container, while FIG. 2 represents that surface which will become the outside of the container. A central portion 21 of the blank between transverse score lines 22 and 23 becomes the body of the container. Vertical score lines 24, 25, 26 and 27 divide the blank into a side panel 28, a front panel 29, a side panel 30, a rear panel 31, and a sealing panel or flap 32. Connected to and integral with the lower edges of panels 28–32 are bottom closure flaps 33, 34, 35, 36 and 37, respectively.

Integral with the upper ends of the panels 28–32 are top closure flaps 38, 39, 40, 41 and 42, respectively. Those portions of the flaps 38–42 beneath a transverse score line 43 define roof and end panels of the carton top closure, while the areas above the score line 43 form an upwardly extending central rib 44 (FIG. 7). Panels 38 and 40 become the gable roof panels, and projecting from these panels are panels 45 and 46, respectively, which form the sides of rib 44.

Diagonal score lines 47 and 48 define fold-back panels 49 and 50 from panel 41. An upwardly projecting extension of panel 41 is divided by a vertical score line 52 into inner rib panels 53 and 54. Diagonal score lines 55 and 56 define fold-back panels 57 and 58 from panel 39. An upwardly projecting extension of panel 39 is divided by a vertical score line 59 into inner rib panels 60 and 61.

A diagonal score line 62 extending across panel 40 and partially across panel 46 and a diagonal score line 63 extending across panel 38 and partially across panel 45 are provided to facilitate spout opening, as will be described hereinafter.

In forming the carton, a first step is to fold the blank lengthwise along the score lines 25 and 27 so that the outside (FIG. 2) surface of flaps 32, 37 and 42 underlie the outer edge of the inner surfaces of panels 31, 36 and 41, respectively. Prior to bringing these surfaces together, they should be heated to a polyethylene softening temperature, i.e., a temperature in the range of 250–600° F. In this way the side seam of the carton will be formed by a polyethylene-polyethylene heat seal, affording a liquid-tight seal. This operation will normally occur at the blank-forming plant, and the side-sealed blanks, as in FIG. 3, will be shipped to the dairy or other filling plant.

In setting up the carton, the side-sealed blank is opened from the flat condition of FIG. 3 to the rectangular condition of FIG. 4. Then the bottom side panels 33 and 35 are pressed inwardly along the score lines 64–65 and 66–67, respectively, as shown by the arrows 68. The front and rear panels 34 and 36 are pressed inwardly, as shown by the arrows 69, and the bottom is heat-sealed, as is well known in the art, to provide a liquid-tight carton bottom, as shown in FIG. 5.

The carton is then filled with the milk, orange juice or other liquid to be packaged therein and the top is closed by exerting closing forces, as shown by the arrows 70 and 71 in FIG. 6, producing the closed carton top, as shown in FIG. 7. During the top-closing operation, heat is supplied to soften the polyethylene of the mating surfaces thereby to provide heat-sealing. The heat for this purpose is usually supplied by an electrically energized radiant heating source. Specifically, the upper inside portions of the panels 45 and 46 are sealed together, the inner surfaces of the panels 53 and 61 are sealed to the inner surface of the panel 45, and the inner surfaces of the panels 54 and 60 are sealed to the inner surface of the panel 46. Presser jaws 72 and 73 contact opposite faces of the panels 45 and 46, respectively, to complete the heat-sealing action. The presser jaws are shaped to provide maximum compression of the upper portions of the panels 45 and 46.

Sealing across the entire areas of the mating top closure surfaces is not needed to provide a liquid-tight seal, and with respect to certain of these surfaces sealing across the entire areas is undesirable, as will be explained hereinafter.

The filled and sealed carton of FIG. 7 may be opened with a pouring spout by exerting an upward and outward pushing pressure, as with the thumbs, on panels 57 and 58, as shown by the arrows 74 and 75 in FIG. 8. This action breaks the seal between panels 60 and 61, leaving the carton partially open, as shown in FIG. 8. The outward motion of the panels 57 and 58 and the adjacent portions of the panels 40 and 38 is facilitated by bending of the panels 40 and 38 along the score lines 62 and 63, respectively. The carton is then completely opened by exerting an inward pushing pressure along the score lines separating panels 57 and 40 and panels 58 and 38, as shown by the arrows 76 and 77 in FIG. 9. This action breaks the seal between panels 60 and 46, between panels 61 and 45, and between the front portions of panels 45 and 46, and forces panels 57 and 58 outwardly to form a pouring spout, as shown in FIG. 9.

In the carton opening and spout forming step, the usual opening forces exerted will not break previously heat-sealed polyethylene-polyethylene bonds, but instead the polyethylene coating will pull away from one or the other of the paper surfaces. When this happens, torn surfaces in which raw and scuffed paper is exposed are presented. By raw paper is meant a paper surface from which some or all of the polyethylene coating is removed by the tearing action occurring during the opening operation. In accordance with the invention, these torn areas are minimized so that only minor areas of raw paper will exist, and these areas are not in the main portions of the pouring spout surface.

This is accomplished by providing an abhesive coating on selected polyethylene surface areas before the carton is heat-sealed. The coating may be applied by printing, brushing or other technique, but is preferably applied by printing during the blank-forming operation. Since both the inside and outside surfaces of the blank require abhesive coating, the printing may be effected on both sides simultaneously, or first on one side then the other. In general, the abhesive coating will be applied while the carton blank is being subjected to the usual printing operation which is conducted to provide the desired advertising matter on the carton. It is desirable that the polyethylene surfaces be receptive to ink and other coating materials, and for this purpose the polyethylene coated paper stock may be subjected to one of the usual treatment operations.

The polyethylene coated paper is shown in exaggerated scale in FIG. 10 and comprises a relatively stiff paperboard sheet 78 coated on each side with a layer of polyethylene, as shown at 79 and 80. The paperboard 78 might be, for example, 0.018 inch thick, the inner polyethylene layer 79 might be, for example, 0.0011 inch thick, while the polyethylene layer 80 might be, for example, 0.00075 inch thick. Selected areas of the polyethylene are supplied with an adhesive coating, as at 81 and 82.

On the inner surface of the blank (FIG. 1), abhesive coatings 83, 84, 85 and 86 (shown as stippled areas) are applied to portions of panels 45, 61, 60 and 46, respectively. On the outer surface of the blank (FIG. 2), abhesive coatings 87 and 88 are applied to portions of panels 60 and 61.

As best shown in FIG. 11, during carton top sealing, areas 87 and 88 are caused to overlie each other. Similarly, area 84 overlies area 83 and area 85 overlies area 86. The upper portions of abhesive areas 83 and 86 overlie each other. The polyethylene and abhesive coating thicknesses in FIG. 11, and also in FIGS. 12 and 13, are greatly exaggerated for purposes of illustration.

During the first part of the carton opening operation (FIG. 12), abhesive coatings 87 and 88 permit panels 60 and 61 to be separated by breaking only the seal along the joined areas of panels 60 and 61, i.e., the areas not protected by the abhesive coatings 87 and 88. This results in some tearing of the joined areas, as shown at 89 and 90 in FIG. 12, but these areas are remote from the pouring part of the spout. During the second part of the carton opening operation, abhesive coatings 84 and 85 and 83 and 84 permit panels 46 and 60 and panels 45 and 61, respectively, to be separated with tearing only along the joined areas designated 91 and 92, respectively, and along the joined areas between panels 45 and 46 above the respective abhesive areas 83 and 86, respectively. The contact between abhesive areas 83 and 86 beyond the juncture of panels 60 and 61 restricts the tearing of the surfaces 45 and 46 to the narrow area above the abhesive areas 83 and 86.

The adhesive coatings 84, 85, 87 and 88 should extend from the tops of their respective panels to the bottom of score line 43. Abhesive coatings 84 and 88 should terminate a short distance, preferably about 3/16", from score line 25. Similarly, abhesive coatings 85 and 87 should terminate a short distance, preferably about 3/16", from score line 26.

Abhesive coatings 83 and 86 extend upwardly from the bottom of score line 43 to a maximum height such that the abhesive coatings are close to but spaced from the top edges of panels 45 and 46, respectively. This minimum spacing from the top edges is preferably between 1/8" and 3/16", and the lateral location of this minimum spacing from score lines 25 and 26, respectively, is equal approximately to the lateral length of the panels 60 and 61. The top edges of the coating areas 83 and 86 are inclined downwardly from the point of minimum spacing toward the score lines 25 and 26, respectively, but at all points along these inclined edges the areas 83 and 86 extend above the corresponding points of areas 84 and 85, respectively, so that, when the carton top is heat-sealed, upper portions of abhesive areas 83 and 86 will overlie each other. These upper portions are above the top edges of the panels 60 and 61.

The top edges of the coating areas 83 and 86 are also inclined downwardly from the point of minimum spacing away from score lines 25 and 26, respectively, to correspond to the shape of the rear walls of the pouring spout when the carton is fully opened. In this way the carton may be opened and the spout formed without tearing the panels 45 and 46 except along their upper edges and adjacent the score lines 25 and 26. The spacing between abhesive areas 83 and 86 and score lines 25 and 26, respectively, should be the same as that between these score lines and the abhesive areas 84 and 85. The spacing between the abhesive areas 83 and 86 and and score lines 24 and 27, respectively, is not critical and should be sufficient to permit spout formation without tearing along the rear edges of the areas 83 and 86.

The abhesive coating material used must meet certain requirements. First, it must adhere to the polyethylene or other thermoplastic surface. In the case of beverage containers, and especially milk cartons, there must be no appreciable flaking of the abhesive coating into the packaged beverage and no transference of the coating into the beverage even under prolonged contact conditions. The abhesive coating should not be heat-sealable at the heat-sealing temperature used, e.g., 250–600° F., and under the sealing pressures used, e.g., 2000 p.s.i. And the abhesive coating should have substantial physical strength to prevent the polyethylene from breaking through the abhesive coating under the abrasive and pressure conditions encountered in heat-sealing.

In accordance with the invention, there will now be described a particular desirable abhesive coating composition which has been found well suited to the requirements of polyethylene coated milk carton service. This composition is basically a varnish with an R.S. nitrocellulose base, a suitable solvent system, a plasticizer and additives to afford adhesion to the polyethylene or other thermoplastic surface and to facilitate release when two abhesive coated surfaces are to be separated.

While other varnish bases such as acrylic or other suitable film-forming resins can be used to produce a usable abhesive composition, nitrocellulose is greatly preferred, and particularly R.S. nitrocellulose. The high nitrogen content of R.S. nitrocellulose (as compared to S.S. nitrocellulose) affords a greater resistance to heat-sealing at higher temperatures. To achieve the best results, it is important that the nitrocellulose content of the abhesive composition be in the range of about 20 to 50 parts by weight.

As is gnerally the case with varnish compositions, the abhesive composition of the invention should include a plasticizer, diethyl phthalate, di-iso-octyl phthalate, and alkyd plasticizers being examples of suitable plasticizers. The amount of plasticizer to be used should be kept to a bare minimum in order to obtain maximum heat resistance of the abhesive coating; the plasticizer should be less than 3% by weight of the composition and preferably the plasticizer is about 2% to 3% by weight of the abhesive composition. Higher plasticizer contents are found to degrade the heat release characteristics of the adhesive composition.

A variety of solvent systems may be used, a number of examples being given in the specific examples below. By appropriate choice of solvent system, the drying rate of the composition may be suitably adjusted. The solvent concentration should be in the range of about 10% to 70% by weight.

Shellac and/or wax have been found to be desirable additives to increase the adhesion of the abhesive coating to the polyethylene surface. The wax should be a hard wax and preferably carnauba wax to provide improved release characteristics due to the resulting hard surface of the dried varnish. Silicone compounds can be used as a desirable additive to improve release characteristics. Rosin can be used as an additive to provide a coating with an improved scuff resistance.

The following are examples of abhesive varnish compositions in accordance with the invention and which are particularly suitable in carrying out the method and producing the product described.

EXAMPLE NO. 1

| | Parts by weight |
|---|---|
| R.S. ½ sec. nitrocellulose, wet basis | 35 |
| Ethyl acetate | 19 |
| Ethanol | 15 |
| Iso-propanol | 12.5 |
| Toluene | 10.0 |
| Cellosolve | 6.5 |
| Shellac, in 40% alcohol solution | 6.5 |
| Carnauba wax | 1.5 |
| Diethyl phthalate | 1.5 |
| Silicone | 0.5 |

In the foregoing example, the ethyl acetate, ethanol, iso-propanol, toluene and Cellosolve form the solvent system, the Cellosolve being used to slow somewhat the drying rate. Cellosolve is a trademark of Carbide and Carbon Chemicals Company for ethylene glycol monethyl ether.

EXAMPLE NO. 2

| | Parts by weight |
|---|---|
| R.S. ½ sec. nitrocellulose | 28 |
| Ethyl acetate | 28 |
| Toluene | 14 |
| Ethyl alcohol | 24 |
| Shellac, in 40% alcohol solution | 134 |
| Dioctyl phthalate | 7 |

The high shellac content of Example No. 2 renders this composition suitable for use with polyethylene which has not been treated to improve the adherence characteristics thereof.

EXAMPLE NO. 3

| | Parts by weight |
|---|---|
| R.S. ½ sec. nitrocellulose | 20–50 |
| Ethyl acetate | 35 |
| Iso-propanol | 12–5 |
| Toluol | 10 |

|                              | Parts by weight |
|---|---|
| Cellosolve                   | 6.5      |
| Diethyl phthalate            | 1.5–5    |
| Shellac, in 40% alcohol solution | 5–15 |
| Carnauba wax                 | 1–5      |
| Silicone                     | 0.25–5   |

Example No. 3 actually represents several examples, since ranges are given for the nitrocellulose, iso-propanol, diethyl phthalate, shellac, wax and silicone.

In general, it has been found desirable to make the abhesive coating thicknesses different on the outside and inside carton surfaces, with the abhesive coating thickness being greater on the inside carton surfaces. Thus, with abhesive coating compositions of the type described above, the abhesive coatings on the inside blank surface (FIG. 1) might, for example, be about 0.0005 to 0.00075 inch thick, while the outside blank surface (FIG. 2) might, for example, have an abhesive coating thickness of about 0.0001 inch.

While the invention has been described in connection with specific embodiments thereof and in specific uses, various modifications thereof will occur to those skilled in the art without departing from the spirit and scope of the invention as set forth in the appended claims.

What is claimed is:

1. In a dispensing container having a tubular body surmounted by a sealed closure sanitarily housing a pouring lip, said closure and lip being formed of sheet material having a polyethylene surface with a sealing resistant coating applied over said surface at said lip, the improvement wherein said sealing resistant coating consists essentially of:

(A) an R.S. nitrocellulose base forming about 12 to 24 percent by weight of said composition;
   (B) a solvent system for said nitrocellulose in a concentration of 10 to 70 percent by weight;
   (C) a plasticizer for said nitrocellulose in a concentration of less than about 3 percent by weight and selected from the class consisting of diethyl phthalate and di-isooctyl phthalate; and
   (D) From about 4 to 25 percent by weight of additives to produce adherence of said composition to the polyethylene surface and to facilitate release of said areas.

2. A sealing resistant coating as defined in claim 1 wherein said additives are selected from the class consisting of carnauba wax, shellac and silicones.

3. A sealing resistant coating as defined in claim 1 wherein said adidtives consist of shellac.

4. A sealing resistant coating as defined in claim 1 wherein said additives consist of silicones.

5. A sealing resistant coating as defined in claim 1 wherein said additives consist of carnauba wax.

References Cited by the Examiner

UNITED STATES PATENTS

| 1,529,056 | 3/1925 | Ellis | 106—195 |
| 2,311,831 | 2/1943 | Haven et al. | 106—195 |
| 2,312,309 | 3/1943 | Bogin et al. | 106—195 |
| 3,094,432 | 6/1963 | Meyer-Jagenberg. | |

FOREIGN PATENTS

| 225,010 | 10/1959 | Australia. |

JOSEPH R. LECLAIR, *Primary Examiner.*

DAVID M. BOCKENEK, *Examiner.*

UNITED STATES PATENT OFFICE
CERTIFICATE OF CORRECTION

Patent No. 3,319,868                                                May 16, 1967

Denis K. Huang et al.

It is hereby certified that error appears in the above numbered patent requiring correction and that the said Letters Patent should read as corrected below.

Column 3, line 71, for "undersirable" read -- undesirable --; column 4, line 52, column 5, line 11, and column 6, line 18, for "adhesive", each occurrence, read -- abhesive --; column 5, line 46, strike out "and", second occurrence; line 65, for "particular" read -- particularly --; column 6, line 8, for "gnerally" read -- generally --; column 8, line 6, for "isoocty." read -- iso-octyl --; line 15, for "adidtives" read -- additives --.

Signed and sealed this 21st day of November 1967.

(SEAL)
Attest:

Edward M. Fletcher, Jr.
Attesting Officer

EDWARD J. BRENNER
Commissioner of Patents